Oct. 10, 1939.  H. H. GREGER  2,175,523

FUEL COMBUSTION CELL

Original Filed Dec. 9, 1932

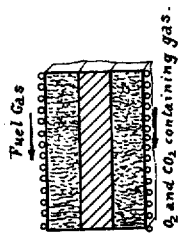

Fig. 1.

Cell of porous electrodes saturated with electrolyte.

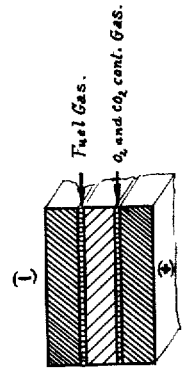

Fig. 2.

Cell of non-porous electrodes. Gases are pressed through a narrow space between diaphragm and electrode.

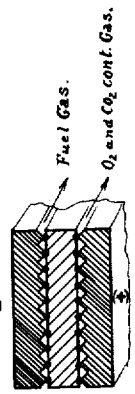

Fig. 3.

dto.
Gas passages provided by shaping of electrodes.

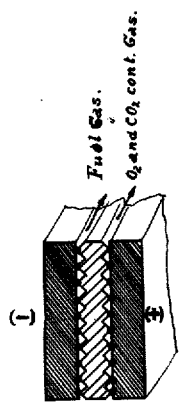

Fig. 4.

dto.
Gas passages provided by shaping of the diaphragm.

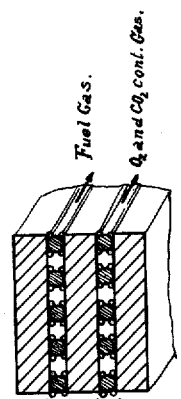

Fig. 5.

dto.
Rod or wire electrodes are provided.

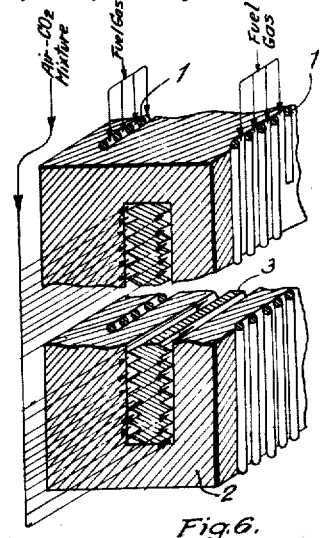

Fig. 6.

Fig. 7.

Diaphragm.
saturated with electrolyte.

Fig. 8.

Electrodes.
of the non-porous type.

Fig. 9.
Places of Electro-chemical Reactions
at the Electrodes where the Electrode, Gas and Electrolyte meet.

Herbert Hans Greger

By

Foster + Codier

Attorneys

Patented Oct. 10, 1939

2,175,523

UNITED STATES PATENT OFFICE 2,175,523

FUEL COMBUSTION CELL

Herbert Hans Greger, Washington, D. C.

Application December 9, 1932, Serial No. 646,562
Renewed March 15, 1939

7 Claims. (Cl. 136—86)

This invention relates to improvements in the construction and operation of "fuel combustion cells", i. e., gas cells and coke cells.

I have found that it is possible to improve the efficiency of fuel combustion cells by supplying air together with carbon dioxide, or air with carbon dioxide in mixture with steam, to the oxidizing electrodes of the cell. These gases must be passed in a suitable manner to one electrode. This manner depends on the construction of the cell and on the composition of the electrode material. Also the other electrode must be constructed in a suitable manner to give best results.

A more detailed description and explanation of the process follows. The common fuel combustion cell consists, as any other galvanic cell, in its essential parts of two electrodes, an electrolyte and a diaphragm. The purpose of these parts is to permit the electrochemical reactions to take place. These depend on a great variety of factors, such as the operating temperature, the type of fuel, the type of electrolyte, the type of electrodes, the construction of the cell, etc.

In operating the cell a fuel gas is introduced at one electrode, where it comes into contact with the electrolyte, and reacts chemically therewith releasing electrical charges, which are imparted to that electrode. Simultaneously an oxygen-containing gas is introduced at other electrode where it comes into contact with the electrolyte, and reacts chemically therewith, releasing electrical charges to this electrode. Also solid fuel may be used in operating such cells.

In order to show more clearly which reactions take place in such a fuel cell it may be assumed that the electrolyte consists of sodium carbonate and the fuel of CO and $H_2$. The following reactions will take place: (In order to avoid confusion as to electrode nomenclature, the electrode at which the oxygen is introduced will be termed the "oxidizing" electrode, while the other electrode will be designated the "fuel" electrode).

1. At the oxidizing electrode:

$$2Na^+ + \tfrac{1}{2}O_2 = Na_2O + 2(+)$$

2. At the fuel electrode:

(a) $CO_3'' + H_2 = CO_2 + H_2O + 2(-)$
(b) $CO_3'' + CO = 2CO_2 + 2(-)$

3. Regeneration of the electrolyte—($Na_2O$ diffuses to the fuel electrode and absorbs $CO_2$ produced by Reaction 2):

$$Na_2O + CO_2 = Na_2CO_3$$

If however, according to my invention, the oxygen containing gas that is introduced at the oxidizing electrode, contains carbon-dioxide, the oxidation of the sodium ion may be carried as far as to sodium carbonate. This may be illustrated by the following reaction:

4. At the oxidizing electrode:

$$2Na^+ + \tfrac{1}{2}O_2 + CO_2 = Na_2CO_3 + 2(+)$$

This oxidation of the sodium ion to sodium carbonate results into a larger amount of free energy being available and consequently into the production of a higher voltage.

The improvement representing the present invention comprises the elimination of the electrochemical effect of a gaseous or $CO_2$ concentration cell.

A probable explanation of the manner of operation of the cells is as follows: on the fuel electrode, carbon dioxide is formed by combustion of the fuel. Assuming that there is no $CO_2$ at the oxygen electrode, a concentration cell will be set up exerting a voltage opposing that generated by the fuel cell proper. However by introducing $CO_2$ with the air at the oxidizing electrode the opposing voltage of the gaseous concentration cell is diminished, thus increasing the net voltage of the fuel cell, or in other words increasing the free energy or available work which the cell may produce.

Another advantage is the fact that the electrolyte is regenerated at the oxidizing electrode, which provides for the possibility of its immediate use again, instead of the sodium oxide diffusing to the fuel electrode and being regenerated there according to Reaction 3. This will result in a decrease of polarisation by regenerating the electrolyte more quickly.

The improvements that are possible by the above process will be evident from the following example: The theoretical voltage of electrochemical hydrogen gas oxidation in the common fuel cell (Reactions 1, 2, 3) is 1.16 volts at 600° C. while up to 1.43 volts are obtained in the improved fuel cell according to Reactions 2 and 4. This improved E. M. F. provides for a general improvement in the performance of the cell and for a higher energy output. For any kind of other fuel corresponding voltages are obtained.

An electrolyte which was found to be suitable for the improved fuel cell consists of fused carbonates, or of a mixture of fused salts containing carbonates, such as for instance of carbonates and halides of the alkali and alkaline earth metals. The cell may be operated at any temperature at which molten carbonates pure or in mixture with other substances form a suitable electrolyte, such electrolytes being disclosed in my copending application Serial No. 646,940, filed December 9, 1932, now patent No. 1,963,550, granted June 19, 1934. However the most suitable operating conditions for practical purposes exist between 500 and about 700° C.

For economic reasons and requirements of absolute stability oxide electrodes are used in this invention to form the oxidizing electrode. It will be readily understood that also other electrode materials may be used, which however are generally more expensive, such as silver nickel-chromium-steels, etc. It is self-evident that this electrode material must show, besides absolute stability under the operating conditions of the cell, also a good conductivity and must permit the development of the proper voltages. Magnetite has been used as material for this electrode construction in fuel cells in the past, but it is quickly oxidized to ferric oxide which is a poor conductor.

Extensive research has revealed that ferrites of the $Me.Fe_2O_3$ type, pure or in their mixtures yield very satisfactory stable electrodes if MeO is the oxide of a bivalent metal which is non-oxidizable, i. e., saturated with oxygen or in its highest state of valence. Such oxides are CuO, MgO, ZnO, NiO, and they may be contained in the ferrite in proportions ranging from ½ to 1½ molecules: For instance,

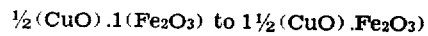

$½(CuO).1(Fe_2O_3)$ to $1½(CuO).Fe_2O_3)$

The just mentioned ferrites are satisfactory conductors at temperatures above 500° C.

Not all types of oxide electrodes permit the development of the full voltages corresponding to the above mentioned Reactions 1, 2, 3, 4. Oxide electrodes often tend to develop the voltage that corresponds to their own oxygen potential at a given temperature, unless proper precautions are taken in the construction of the cell.

Reference is made at this point to the accompanying drawing in which:

Figure 1 illustrates the electrode-diaphragm assembly as used if a precious metal such as silver is used as the electrode material, and is included herewith to clarify the present explanation by direct comparison.

Figures 2 to 6 illustrate the electrode-diaphragm assemblies in various modifications as embodied in the present invention.

Figures 7, 8 and 9 explain the symbols employed in the drawing.

The performance of the cell is poor if the oxide electrodes are highly porous and contain the electrolyte in their pores. The most unfavorable condition of such electrodes is illustrated by Fig. 1 of the accompanying drawing in which a section of a cell is given, constructed of a porous oxide oxidizing electrode and a fuel electrode separated by a diaphragm. They are saturated by the electrolyte. In such electrodes the electrochemical reactions take plate directly between the oxide material and the ions of the electrolyte, instead of taking place at the outer surfaces of the electrodes to which fuel gas, as well as oxygen and carbon dioxide-containing gas are passed as indicated in the drawing. Since the main part of the electrochemical reactions take place in the electrode pores small opportunity exists for the carbon dioxide to become electromotively active because it can not penetrate into the pores while the oxygen is absorbed by the electrode material itself and becomes electromotively active by this absorption. The porous oxide electrodes act like a filter for the above mentioned fuel cell Reactions 2 and 4. The areas at which the electrochemical reactions should take place are indicated in the drawing by small circles.

The voltages of cells constructed of oxide electrodes are sometimes very much lower than the maximum voltages and currents that can be obtained if such fuel combustion cells are properly constructed and operated. However, if even in a poorly constructed cell a precious metal, such as silver for instance, is used instead of the oxide as an electrode material, the electrical results are excellent and the proper theoretical voltages for the fuel cell Reactions 2 and 4, are obtained without any difficulty. This shows that the electrode material has an important bearing on the performance of the cell.

However I have found that the oxide electrodes give very satisfactory results too if their shape as well as the construction and operation of the cell are adapted to the particular needs of the process. These requirements are met in the following manner:

The oxygen and carbon dioxide containing gas is passed through a space between the oxide electrode and the diaphragm which is saturated with the electrolyte. Thus the areas at which the electrochemical reactions take place are on the electrode surface which faces the diaphragm and the electrolyte. Through this method of cell construction and operation the oxide electrodes obtain the electrochemical properties of precious metals, because there is no possibility that the reactions between the electrolyte and the electrode can eliminate the fuel cell Reactions 2 and 4 either in part or in whole. The space between the diaphragm and the electrode may have a variety of shapes depending on the shape that is intended for the gas passage, as shown in Figs. 2, 3, 4, 5 and 6.

The method of cell construction that has been just described for the oxidizing electrode must be used for the fuel electrode. Fuel gas is passed through space between the latter electrode and the diaphragm. Through this method electrodes produced from cheap metals such as iron, iron alloys, copper and copper alloys are effectively protected from electrochemical oxidation in the cell. Otherwise metal oxides are formed on this electrode through the electrochemical oxidation thereof. These metal oxides may tend to impose their own usually lower voltage, on the cell, as has been described in connection with the oxidizing electrode.

Fig. 6 demonstrates an important development in the construction of gas cells. The two larger surfaces of an oxide electrode are prepared as electrode surfaces and shaped in suitable manner to provide gas passages. This oxide electrode is entirely enveloped by the diaphragm (as indicated by the lower end of Fig. 6), except in those places where the $O_2$ and $CO_2$ containing gas enters and leaves the gas passages of the electrode. In all places where the oxidizing electrode touches the diaphragm, both are solidly joined in the process of manufacture. This may be achieved by a suitable heat treatment in the same manner as is frequently done in the pottery industry by joining two pieces of clay together in the process of burning. In this way solid oxidizing electrode diaphragm blocks are produced, which greatly simplify the construction of the cell. These blocks may be manufactured in any desirable sizes and shapes and may be put together in various ways to form a cell.

For instance, wire may serve as the fuel cathode, as indicated in Fig. 6. These electrodes are placed between two oxidizing electrodes diaphragm blocks. Thus each oxidizing electrode as well as each fuel electrode operates for two cells which is of great importance for the economic construction of fuel combustion cells.

The direction which these wire electrodes occupy in the cell obviously determine the course of the fuel gas. The current of the fuel gas may thus be made to flow either parallel to the $O_2$ and $CO_2$ containing gas, or both gas currents may be crossed or may have any other desirable direction. However, for the production of an absolute gas tightness in the cell and for insulating the oxidizing and fuel electrode terminals properly and effectively, I have found it preferable to cross the two gas currents, as shown in Fig. 6.

Whereas I have described my invention by reference to specific forms thereof, it will be understood that many changes and modifications may be made without departing from my invention.

I claim:

1. The process of generating electricity which comprises introducing a fuel gas into a gas cell at one electrode thereof where it contacts an electrolyte comprising a fused mixture of alkali and alkaline earth metal carbonates and halides and reacts chemically therewith releasing electrical charges to said electrode and simultaneously introducing at least one gas containing oxygen and a carbon dioxide containing gas at the other electrode where it contacts said electrolyte and reacts chemically therewith releasing electrical charges which are imparted to said other electrode.

2. The process of generating electricity which comprises introducing a fuel gas into a gas cell at one electrode thereof where it contacts an electrolyte comprising a fused mixture of alkali and alkaline earth metal carbonates and halides and reacts chemically therewith releasing electrical charges to said electrode and simultaneously introducing a gaseous mixture comprising air and carbon dioxide at the other electrode where it contacts said electrolyte and reacts chemically therewith releasing electrical charges which are imparted to said other electrode.

3. The process of generating electricity which comprises introducing a fuel gas into a gas cell at one electrode thereof when it contacts an electrolyte comprising a fused mixture of alkali and alkaline earth metal carbonates and halides and reacts chemically therewith releasing electrical charges to said electrode and simultaneously introducing a gaseous mixture comprising oxygen and carbon dioxide at the other electrode where it contacts said electrolyte and reacts chemically therewith releasing electrical charges which are imparted to said other electrode.

4. The process of generating electricity which comprises introducing a fuel gas into a gas cell at one electrode thereof which it contacts an electrolyte comprising a fused mixture of alkali and alkaline earth metal carbonates and halides and reacts chemically therewith releasing electrical charges to said electrode and simultaneously introducing a gas containing air, steam and carbon dioxide at the other electrode where it contacts said electrolyte and reacts chemically therewith releasing electrical charges which are imparted to said other electrode.

5. The method of generating electricity which comprises burning a fuel at one electrode of a cell consisting of a fuel electrode, an oxidizing electrode and an electrolyte comprising a fused mixture of alkali and alkaline earth metal carbonates and halides, an oxygen containing gas together with a carbon dioxide containing gas being introduced into the cell at the said oxygen electrode, electricity being generated as a result of chemical reactions effected under the conditions described.

6. The method as described in claim 5 in which the fuel electrode is solid and carbonaceous.

7. The process of generating electricity in a fuel cell of two electrodes, a diaphragm and an electrolyte, which comprises introducing a fuel gas into a gas cell at one electrode where it contacts an electrolyte comprising a fused mixture of alkali metal and alkaline earth metal carbonates and halides, and simultaneously introducing a gas containing air and carbon dioxide at the other electrode where it also contacts said electrolyte, the two gases and the electrolyte reacting chemically to produce energy which under the conditions specified becomes available as electrical energy.

HERBERT H. GREGER.

CERTIFICATE OF CORRECTION.

Patent No. 2,175,523.            October 10, 1939.

HERBERT HANS GREGER.

It is hereby certified that error appears in the printed specification of the above numbered patent requiring correction as follows: Page 3, second column, line 15, claim 4, for the word "which" read where; and that the said Letters Patent should be read with this correction therein that the same may conform to the record of the case in the Patent Office.

Signed and sealed this 14th day of November, A. D. 1939.

Henry Van Arsdale,
Acting Commissioner of Patents.

(Seal)

sizes and shapes and may be put together in various ways to form a cell.

For instance, wire may serve as the fuel cathode, as indicated in Fig. 6. These electrodes are placed between two oxidizing electrodes diaphragm blocks. Thus each oxidizing electrode as well as each fuel electrode operates for two cells which is of great importance for the economic construction of fuel combustion cells.

The direction which these wire electrodes occupy in the cell obviously determine the course of the fuel gas. The current of the fuel gas may thus be made to flow either parallel to the $O_2$ and $CO_2$ containing gas, or both gas currents may be crossed or may have any other desirable direction. However, for the production of an absolute gas tightness in the cell and for insulating the oxidizing and fuel electrode terminals properly and effectively, I have found it preferable to cross the two gas currents, as shown in Fig. 6.

Whereas I have described my invention by reference to specific forms thereof, it will be understood that many changes and modifications may be made without departing from my invention.

I claim:

1. The process of generating electricity which comprises introducing a fuel gas into a gas cell at one electrode thereof where it contacts an electrolyte comprising a fused mixture of alkali and alkaline earth metal carbonates and halides and reacts chemically therewith releasing electrical charges to said electrode and simultaneously introducing at least one gas containing oxygen and a carbon dioxide containing gas at the other electrode where it contacts said electrolyte and reacts chemically therewith releasing electrical charges which are imparted to said other electrode.

2. The process of generating electricity which comprises introducing a fuel gas into a gas cell at one electrode thereof where it contacts an electrolyte comprising a fused mixture of alkali and alkaline earth metal carbonates and halides and reacts chemically therewith releasing electrical charges to said electrode and simultaneously introducing a gaseous mixture comprising air and carbon dioxide at the other electrode where it contacts said electrolyte and reacts chemically therewith releasing electrical charges which are imparted to said other electrode.

3. The process of generating electricity which comprises introducing a fuel gas into a gas cell at one electrode thereof when it contacts an electrolyte comprising a fused mixture of alkali and alkaline earth metal carbonates and halides and reacts chemically therewith releasing electrical charges to said electrode and simultaneously introducing a gaseous mixture comprising oxygen and carbon dioxide at the other electrode where it contacts said electrolyte and reacts chemically therewith releasing electrical charges which are imparted to said other electrode.

4. The process of generating electricity which comprises introducing a fuel gas into a gas cell at one electrode thereof which it contacts an electrolyte comprising a fused mixture of alkali and alkaline earth metal carbonates and halides and reacts chemically therewith releasing electrical charges to said electrode and simultaneously introducing a gas containing air, steam and carbon dioxide at the other electrode where it contacts said electrolyte and reacts chemically therewith releasing electrical charges which are imparted to said other electrode.

5. The method of generating electricity which comprises burning a fuel at one electrode of a cell consisting of a fuel electrode, an oxidizing electrode and an electrolyte comprising a fused mixture of alkali and alkaline earth metal carbonates and halides, an oxygen containing gas together with a carbon dioxide containing gas being introduced into the cell at the said oxygen electrode, electricity being generated as a result of chemical reactions effected under the conditions described.

6. The method as described in claim 5 in which the fuel electrode is solid and carbonaceous.

7. The process of generating electricity in a fuel cell of two electrodes, a diaphragm and an electrolyte, which comprises introducing a fuel gas into a gas cell at one electrode where it contacts an electrolyte comprising a fused mixture of alkali metal and alkaline earth metal carbonates and halides, and simultaneously introducing a gas containing air and carbon dioxide at the other electrode where it also contacts said electrolyte, the two gases and the electrolyte reacting chemically to produce energy which under the conditions specified becomes available as electrical energy.

HERBERT H. GREGER.

CERTIFICATE OF CORRECTION.

Patent No. 2,175,523.  October 10, 1939.

HERBERT HANS GREGER.

It is hereby certified that error appears in the printed specification of the above numbered patent requiring correction as follows: Page 3, second column, line 15, claim 4, for the word "which" read where; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.